United States Patent [19]

Jackson et al.

[11] 4,283,996
[45] Aug. 18, 1981

[54] HEADER HEIGHT VALVE

[75] Inventors: Alan D. Jackson; Frank N. Alexander, both of Hutchinson; Homer R. Graber, Pretty Prairie, all of Kans.

[73] Assignee: The Cessna Aircraft Company, Wichita, Kans.

[21] Appl. No.: 19,815

[22] Filed: Mar. 12, 1979

[51] Int. Cl.³ .................. F15B 11/08; F15B 13/04
[52] U.S. Cl. ................................................ 91/447
[58] Field of Search .............................. 91/446, 447

[56] References Cited

U.S. PATENT DOCUMENTS

| 3,049,101 | 8/1962 | Ruhl | 91/447 X |
|---|---|---|---|
| 3,198,088 | 8/1965 | Johnson et al. | 91/447 X |
| 3,272,085 | 9/1966 | Hajma | 91/447 X |
| 3,410,306 | 11/1968 | Malott | 91/447 X |
| 3,508,847 | 4/1970 | Martin | 417/300 X |
| 3,980,000 | 9/1976 | Iijima et al. | 91/447 X |
| 4,180,908 | 12/1979 | Budzich | 91/446 X |

Primary Examiner—Chris K. Moore

[57] ABSTRACT

A hydraulic valve in a load responsive pressure flow compensated system for operating a header height cylinder including a lockout check valve which is opened by an accompanying plunger experiencing pressure in an adjacent motor port. Said plunger includes a metering notch opening to drain when the plunger is actuated, said metering notch is sized larger than the flow-sensing notch on the valve spool so that while lowering the machine header, the pressure compensating means of the system does not go to full pressure compensation level but rather stands by at the low pressure level relieved across the lockout actuating plunger. The valve further includes metering notches in the control valve spool which are so shaped that a FLOW vs. TIME curve of the spool from the neutral position to an operating position has a plateau at a time interval from zero which is substantially equal to one-half of the cycle time of the natural frequency of the machine.

10 Claims, 3 Drawing Figures

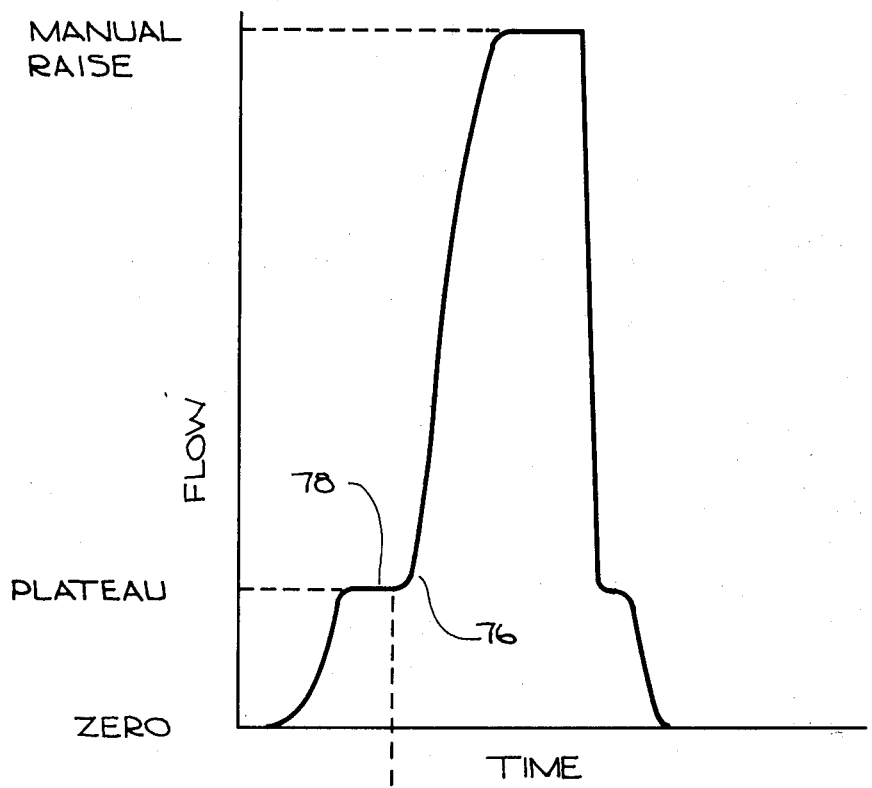
FIG. 2 FLOW vs. TIME
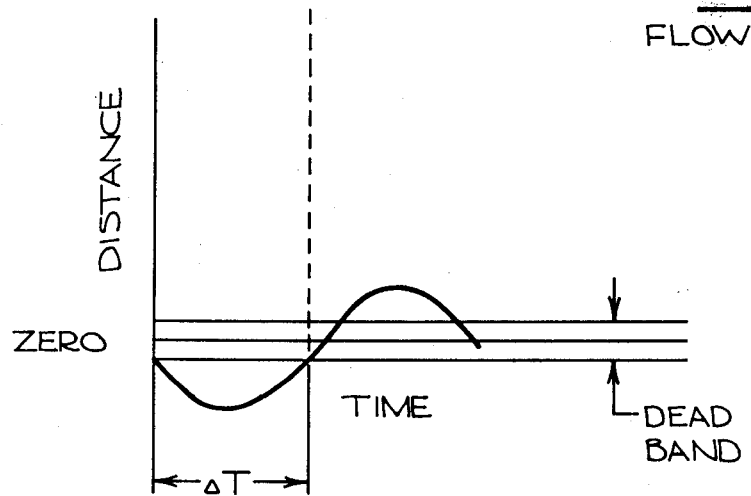
FIG. 3 HEADER DISPLACEMENT vs. TIME

HEADER HEIGHT VALVE

BACKGROUND OF THE INVENTION

With the larger and heavier combines and swathers of the present generation, the problem of holding the machine's header at a proper operating height above the ground has become more difficult. Current systems utilize electro-hydraulic controls which can be set for manual or automatic operation. The operating requirements for manual or automatic control must be responsive enough to raise the header from ground level to its maximum working height in approximately four seconds, as well as lowering the header in a similar time interval. This fast time response is necessary to maximize the crop intake while minimizing the chances of digging the header into the soil. Most present day combines include mechanical sensors under the cutter bar which sense the ground clearance and are connected through a mechanical linkage to contact switches which generate a raise or lower signal at each side of a dead band range. In the dead band range a neutral signal is given to the valve. A combine of the type just mentioned operating in an automatic mode becomes very unstable because when the header is raised the resulting acceleration stores energy in the combine's large pneumatic tires and overall mass. When the header is high enough to lose the raise signal, the combination of the moving header's inertia and the feedback of stored energy causes the header to overshoot the dead band and the sensor then generates a down signal. As the header drops, the down signal is lost as it enters the dead band but the inertia causes the tires to deflect, dropping the header close enough to the ground to trigger a raise signal and the up-and-down cycle repeats itself with the sensors searching for the dead band (neutral), while the machine rocks up and down. One of the most obvious solutions to this problem would be to expand the dead band area enough to prevent the header from overshooting its signal; however, this type of remedy is very limited if the cutting height on the crop is to be maintained at a maximum no larger than one inch. Some prior art remedies to this problem have been to limit the maximum flow rate to the system sufficiently that the automatic system becomes stable. However, as machine capacities and ground speeds increase, there is required an increased response capability of the control system to avoid the variances in ground terrain.

DESCRIPTION OF THE PRESENT INVENTION

To overcome these problems, the present invention limits, when required, the maximum acceleration of the header which also limits the amount of stored energy within the pneumatic tires which for a given machine mass and tire size is directly related to the stability of the machine. Given a means of generating a repeated hydraulic response, such as the valve of the present invention, a FLOW vs. TIME curve from no-flow to full-flow, and full-flow to no-flow, can be constructed so that there is a plateau in the flow curve of a time duration from zero of approximately one-half of the cycle time of the natural frequency of the overall machine. For any machine, the header height relative to the ground can be plotted as a function of time with the dead band superimposed over the displacement curve of the machine. In viewing the curve with the dead band area eliminated, the time that the header displacement curve is outside the dead band is consistent and predictable if the mass of the machine and the tire size and pressure are known. It is possible then to design a FLOW vs. TIME transition curve which allows quick response to avoid obstacles and maintain a speed acceptable for manual operation of the header (for long duration signals), and low flow rates for short duration signals in the automatic mode. The importance of low flow rate may be seen if it is remembered that acceleration of the header is a function of the slope of the flow curve. Therefore, if the flow rate is low enough, the header may be brought to a stop before it passes through a given portion of the dead band. Also, the low flow rate allows the slope of the deceleration curve to remain at an acceptable level and the amplitude of the displacement curve will fall within the remainder of the dead band curve and the machine will become stable. It is then only necessary to get a plateau on the flow curve which from time zero is longer than the time spent outside the dead band and the machine becomes stable when no further corrections are required from an outside source, but retains the additional flow capability of avoiding obstacles if the input signal is of a longer duration than the plateau length.

The principal object of the present invention is to provide a control valve in load responsive systems which prevents the variable volume pump from going to maximum pressure while lowering a heavy static load.

Another object of the present invention is to provide a pilot-operated header height control valve with the metering notches in the valve so shaped that a FLOW vs. TIME curve from the neutral position defines a plateau from time zero which is a longer time interval than one-half of the natural frequency of the spring mass of the overall combine.

Other objects and advantages of the present invention will become more apparent to those skilled in the art from the detailed description which follows with references to the accompanying drawing wherein:

FIG. 2 is a FLOW vs. TIME curve of the valve of the present invention; and

FIG. 3 is a curve illustrating header height position vs. time.

DESCRIPTION OF THE PREFERRED EMBODIMENT OF THE DRAWING

Figure 1:
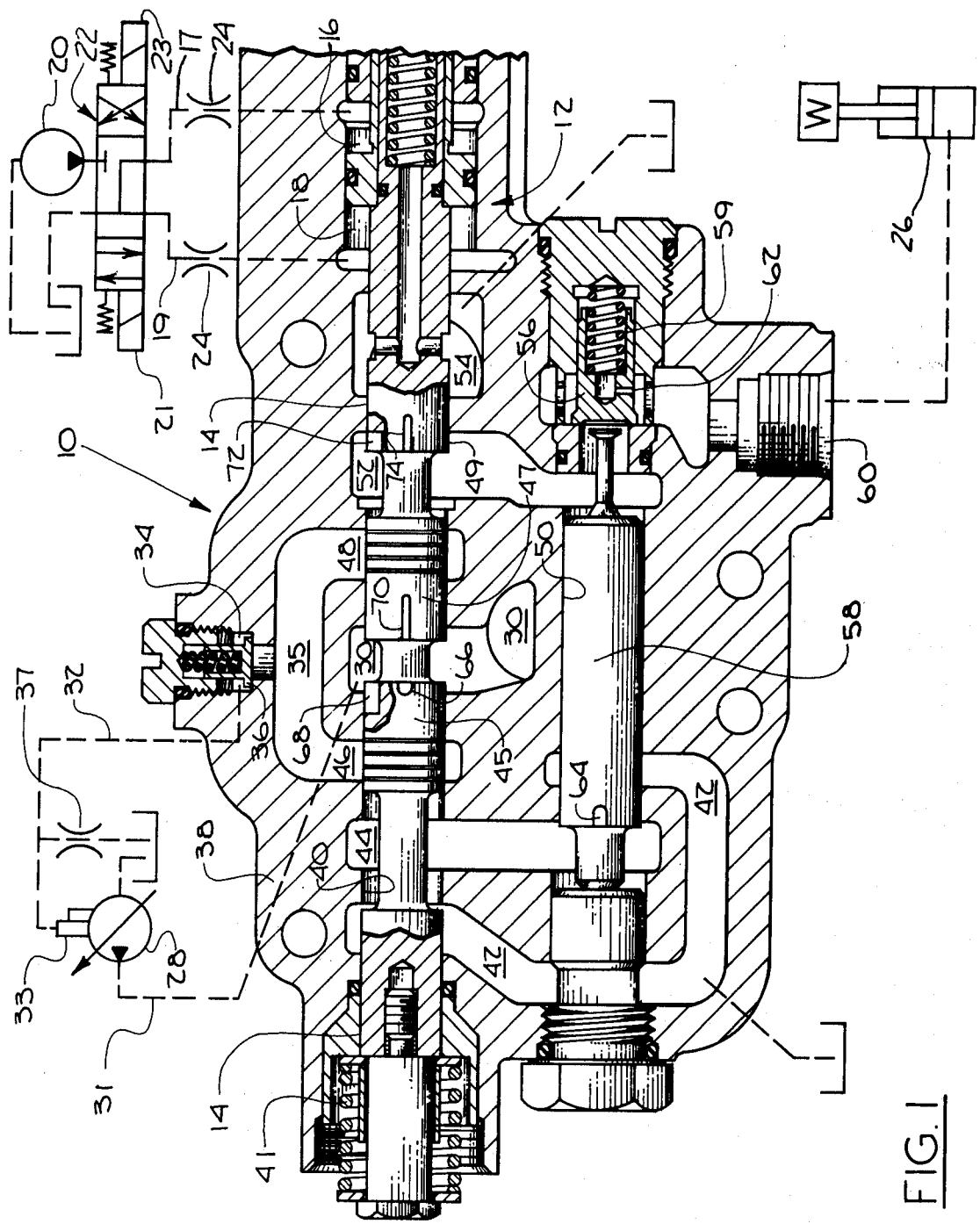
FIG. 1 is a longitudinal cross sectional view of the control valve of the present invention with its associated circuit schematically shown.

With reference to FIG. 1 of the drawing, the pilot-operated directional control valve of the present invention is generally referred to by reference numeral 10. Valve 10 is pilot-operated by double-acting servo cylinder 12 formed on the righthand end of valve spool 14. Servo cylinder 12 includes right and left chambers 16 and 18 supplied by lines 17 and 19. Servo cylinder 12 is supplied by constant low pressure fluid from pump 20 through a conventional four-way valve 22 so that servo cylinder 12 will always move at a constant speed which is governed by the size of orifices 24.

Header height control valve 10 controls a single acting cylinder 26 which supports the weight of a combine header W which always exerts a downward or retraction load on the cylinder 26.

The header height valve 10 is supplied by fluid pressure in pump pressure cavity 30 by a conventional axial piston variable volume flow pressure compensated pump 28. A typical pump of this nature is illustrated in U.S. Pat. No. 3,508,847. Pump 28 supplies pump pressure to pump cavity 30 through schematically shown line 31. Signal line 32 connects the flow compensator 33 of the pump to a passage 34 which in turn connects with a u-shaped signal passage 35 across a check valve 36. Signal line 32 also includes a small bleed-down orifice 37 which allows the signal line to bleed-down when there is no pressure in signal passage 35.

Control valve 10 includes a valve body 38 having a spool bore 40 in receipt of a slidable valve spool 14. Located on the left end of spool 14 is a conventional centering spring 41 which returns the valve spool 14 to its center or neutral position, as illustrated in the drawing, whenever the pressures are relieved from chambers 16 and 18 of the servo cylinder 12. The spool bore 40 intersects a plurality of chambers therealong from left to right including drain cavity 42, second motor port cavity 44, left leg 46 of signal passage 35, pump pressure cavity 30, right leg 48 of signal passage 35, first motor port cavity 52 and drain cavity 54.

Located in the lower portion of valve body 38 is a second bore 50 for receipt of lockout check valve 56 and lockout opening plunger 58. Check valve 56 is held closed by spring 59 as well as the pressure experienced in the motor port 60 through lateral passage 62. The left end of plunger 58 has a substantially larger area than the right end of check valve 56 so that the pressure in cavity 44 necessary to open lockout 56 is substantially less than the load pressure experienced in the motor port 60 at the end of first motor port cavity 52. The left end of plunger 58 acts not only as a servo means for opening lockout valve 56 but also as a relief means through notch 64. Notch 64 opens to drain passage 42 upon the rightward extension of plunger 58 so as to relieve pressure in second motor port cavity 44 at a substantially low pressure.

Valve spool 14 includes two pairs of oppositely-spaced metering notches 66 and 68 on spool land 45 for metering pressure from pump cavity 30 into the left leg 46 of signal passage 35. Located on spool land 47 are a pair of notches 70 which meter flow from pump cavity 30 to the right leg 48 of signal passage 35 which in turn is open to second motor port cavity 44. Notches 70 are sized substantially smaller than notch 64 on plunger 58 so that the pressure build-up in signal passage 35 stays substantially the same regardless of the flow therethrough. Located in valve spool land 49 are two pairs of metering notches 72 and 74 for metering flow from motor port cavity 52 into drain cavity 54.

OPERATION

To lower the machine header W, either manually or in an automatic mode, solenoid 23 of pilot valve 22 is energized shifting pilot valve to the left thereby pressurizing left chamber 18 of servo cylinder 12 while draining opposing chamber 16. Valve spool 14 now begins to move rightward from its neutral position illustrated in the drawing at a constant rate governed by the size of orifice 24. As spool 14 moves rightwardly, the left edge of land 45 opens to bore 40 just prior to notch 70 opening to signal passage 35. In this second spool position, the fluid flowing across notch 70 quickly pressurizes motor port cavity 44 causing plunger 58 to shift rightwardly opening lockout check 59 and dumping the pressure in cavity 44 to drain through drain cavity 42. Whatever pressure is experienced in signal passage 35 is sensed by the pump flow compensator 33 causing the pump to come up to that pressure plus a fixed amount such as 200 PSI. Since notch 64 is sized larger than notch 70, the pressure in passage 35 is limited to that level which notch 64 dumps to drain. This prevents the pump 28 from going to full pressure compensation. As valve spool 14 continues to move at a constant rate, it begins to meter flow from motor port cavity 52 across notches 74 to drain cavity 54 which may be referred to as a third spool position. At this point, motor port cavity 52 is experiencing the pressure caused by the header weight W since lockout valve 56 is now open due to the extension of plunger 58. If solenoid 23 of the pilot valve 22 continues to receive a lower signal, valve spool 14 will continue to move to the right until larger notches 72 begin to open into drain cavity 54 causing the flow rate through the valve to substantially increase. In viewing the FLOW vs. TIME curve of FIG. 2, notches 72 begin to open at point 76 on the curve. By properly shaping the length, depth and cross section of metering notches 72 and 74, a FLOW vs. TIME curve similar to FIG. 2 can be achieved which provides a plateau 78 prior to the opening of the secondary notches 72. As long as the time interval from point zero to the end of plateau 78 is longer than the delta T of the FIG. 3 curve, the header will not become unstable. When the lower signal is no longer received by solenoid 23, pilot valve 22 returns to the neutral position and servo cylinder 12 returns to neutral.

When the mechanical feeler on the machine header (not shown in the drawing) receives a raise signal, solenoid 21 of pilot valve 22 is energized shifting the valve to the right thereby pressurizing right chamber 16 of servo cylinder 12 causing valve spool 14 to move to the left from its neutral position, as illustrated in the drawing which may be referred to as a fourth spool position. First, the right edge of valve spool land 47 opens into the right leg 48 of signal passage 35 and then upon further movement notches 68 open into left leg 46 thereby metering pump pressure from pump cavity 30 into signal passage 35 and motor port cavity 52. As long as the pump output is connected to signal passage 35, the pressure will rise due to the signal transmitted through signal line 32 until the pressure exceeds the opposing pressure on lockout 56 thereby opening same and raising header cylinder 26. If the system continues to receive a raise signal from solenoid 21, valve spool 14 will continue movement to the left opening larger metering notches 66 into signal passage 35 thereby causing the flow rate through the valve to increase substantially. In viewing the curve in FIG. 2, point 76 on the curve is where notches 66 begin to open into the signal passage 35. If the original signal to solenoid 21 was lost prior to that point in time indicated by point 76 on the curve, the valve spool would have been returned to neutral and the plateau 78 would not have been exceeded.

Having described the invention with sufficient clarity to enable those familiar with the art to construct and use it, we claim:

1. A hydraulic valve in a load responsive system supplied by a pressure flow compensated variable displacement pump having a flow compensating means, said valve raising and lowering a header height cylinder under load on a machine, the improvement comprising:
   a valve body;
   a first bore in the body;

a valve spool means having lands and grooves to control flow to and from the header height cylinder, said spool means positioned in the first bore;

a pump pressure cavity intersecting the first bore and connected to the pump discharge;

first and second motor port cavities intersecting the first bore on opposite sides of the pump cavity with the first motor port cavity connecting to the header height cylinder;

a drain cavity adjacent the first motor port cavity;

a signal passage intersecting the first bore intermediate the pump cavity and each motor port cavity, the signal passage connecting with the flow compensating means of said pump;

a lockout check valve positioned in the first motor port cavity blocking flow from the header height cylinder to the bore;

servo means actuated by pressure in the second motor port cavity acting against the lockout check valve, whereupon pressure in the second motor port cavity actuates the servo means and opens the lockout check allowing backflow into the first bore due to the load on the header height cylinder;

low pressure relief valve means in the second motor port cavity connectible to drain;

the valve spool means having:
  a first neutral position, blocking flow to or from the pump cavity and blocking flow to or from the motor port cavities;
  a second position of the valve pool, opening the signal passage to the second motor port, and metering the flow from the pump pressure cavity into the signal passage thereby actuating the servo means and passing flow over said relief valve means whereby the flow compensating means of the pump maintains a relatively low pump discharge pressure level; and
  a third lowering position of the valve spool metering flow from the first motor port cavity to drain while continuing to meter flow from the pump across the signal passage and over said relief valve means.

2. A hydraulic valve as set forth in claim 1, including a second bore in the body intersecting the first and second motor port cavities wherein the servo means includes a pressure responsive plunger positioned in the second bore, and the relief valve means comprises a metering notch in said plunger sized to relieve any flow across the signal passage.

3. A hydraulic valve as set forth in claim 1, wherein the servo means includes a pressure responsive plunger acting against pressure in the header height cylinder and the relief valve means comprises a metering notch in said plunger sized to relieve any flow across the signal passage.

4. A hydraulic valve as set forth in claim 1, wherein the servo means includes a pressure responsive plunger acting against a reduced area on the lockout check which is experiencing load pressure from the header height cylinder, and the relief valve means comprises a metering notch in said plunger sized to handle any flow across the signal passage.

5. A hydraulic valve as set forth in claim 1, wherein a portion of the signal passage is a u-shaped cavity intersecting the first bore on both sides of the pump cavity and includes a check valve between the u-shaped portion and the pump compensator.

6. A hydraulic valve as set forth in claim 1, wherein the valve spool means includes lands with metering notches therein handling flow from the pump cavity into the signal passage and flow from the first motor port cavity to drain.

7. A hydraulic valve as set forth in claim 1, wherein the valve spool means has a fourth raising position opening the signal passage to the first motor port cavity and also metering the pump discharge flow from the pump cavity across the signal passage to the header height cylinder being actuated.

8. A hydraulic valve as set forth in claim 1, further including a second servo means connected to the valve spool means for operating same at a constant speed; the valve spool means having a fourth raise position, opening the signal passage to the first motor port cavity and metering flow from the pump cavity across the signal passage to the cylinder being actuated.

9. A hydraulic valve as set forth in claim 8, wherein the valve spool means includes lands with metering notches therein utilized in the third and fourth spool positions, said notches being shaped and longitudinally positioned on the spool so that a FLOW vs. TIME curve of the spool means from the neutral position to the third or fourth positions has a plateau at a time interval from zero which is greater than one-half the cycle time of the natural frequency of the machine.

10. A hydraulic valve as set forth in claim 1, wherein the valve spool means includes lands with metering notches therein shaped and longitudinally positioned on the spool so that a FLOW vs. TIME curve of the spool means from the neutral position to the third position has a plateau at the time interval substantially equal to one-half the natural frequency of the machine.

* * * * *